US006275978B1

(12) United States Patent
Bell

(10) Patent No.: US 6,275,978 B1
(45) Date of Patent: Aug. 14, 2001

(54) SYSTEM AND METHOD FOR TERM LOCALIZATION DIFFERENTIATION USING A RESOURCE BUNDLE GENERATOR

(75) Inventor: Mark A. Bell, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/185,919

(22) Filed: Nov. 4, 1998

(51) Int. Cl.$^7$ .............................. G06F 9/45; G06F 17/20
(52) U.S. Cl. ....................... 717/2; 717/5; 704/8; 707/536
(58) Field of Search ............................ 717/1, 2, 5; 704/8; 707/536

(56) References Cited

U.S. PATENT DOCUMENTS

| | | | |
|---|---|---|---|
| 5,222,160 | * 6/1993 | Sakai et al. | 704/8 |
| 5,500,881 | * 3/1996 | Levin et al. | 717/1 |
| 5,613,122 | * 3/1997 | Burnard et al. | 717/1 |
| 5,630,131 | * 5/1997 | Palevich et al. | 717/1 |
| 5,652,884 | * 7/1997 | Palevich | 717/11 |
| 5,664,206 | * 9/1997 | Murrow et al. | 704/8 |
| 5,678,039 | * 10/1997 | Hinks et al. | 717/5 |
| 5,687,366 | * 11/1997 | Harvey, III et al. | 717/5 |
| 5,748,961 | * 5/1998 | Hanna et al. | 717/1 |
| 5,873,111 | * 2/1999 | Edberg | 707/536 |
| 5,907,326 | * 5/1999 | Atkin et al. | 345/334 |
| 5,917,484 | * 6/1999 | Mullaney | 345/333 |
| 5,953,526 | * 9/1999 | Day et al. | 717/1 |
| 5,963,924 | * 10/1999 | Williams et al. | 705/40 |
| 6,111,572 | * 8/2000 | Blair et al. | 345/333 |
| 6,119,079 | * 9/2000 | Wang et al. | 704/8 |

OTHER PUBLICATIONS

Brookshier, D.; JavaBeans Developer's Reference. New Riders, Macmillian Computer Publishing, Chapter 11, Mar. 1997.*

Fishwick, P.; "Web–based simulation: Some personal observations". ACM[online], Proceedings of the conference on Winter simulation, pp 772–779, Dec. 1996.*

Stapleton, L.; "Internationalization: JDK 1.1 Has major New Features and Fixes". Accessed on 2000–09–19, Retreived from the Internet: http://developer.java.sun.com/servlet/printpageservlet, Dec. 1996.*

O'Conner, J.; "Java Internationalization: An Overview". Accessed on 2000–09–19, Retreived from the Internet: http://developer.java.sun.com/servlet/printpageservlet, Jul. 1998.*

O'Conner, J.; Internationalization: Localization with ResourceBundles. Accessed on 2000–09–19, Retreived from the Internet: http://developer.java.sun.com/servlet/printpageservlet, Oct. 1998.*

Jaworski, J.; Java 1.1 Developer's Guide, Second Edition. Sams, Macmillian Computer Publishing, pp 297–300 and pp 425–440, Aug. 1997.*

(List continued on next page.)

Primary Examiner—Mark R. Powell
Assistant Examiner—Kelvin Booker
(74) Attorney, Agent, or Firm—Alex J. Neudeck

(57) ABSTRACT

An apparatus and method providing flexible message differentiation of localized terms utilizing a resource bundle generator. In particular, the apparatus and method are accomplished by having a system and method for term localization differentiation. The message differentiation apparatus and method utilize a second key to assist the resource bundle generator in the localization of the input string. The second key should be descriptive and provide some context of the string to be translated. If the string being localized is a message, the second key should characterize the string in the proper context.

20 Claims, 5 Drawing Sheets

OTHER PUBLICATIONS

Morrison et al.; Java 1.1 Unleashed, Third Edition. Sams, Macmillian Computer Publishing, chapters 9, 11 and 52, May 1997.*

Walsh et al.; Java Bible. IDG Books, IDG Books Worldwide Incorporated, chapter 12: section string tokenizer and resource bundles; and tables 12–29, 12–30 and 12–31, May 1998.*

Inprise Corporation; "JBuilder 3: Quick Start". Inprise Corporation, 1997.*

Sun Microsystems Incorporated; "JDK 1.1 Internationalization Overview". Accessed on 2000–09–19. Retrieved from the Internet: Http://java.sun.com/products/jdk/1.1/docs/guide/intl/intl.doc.html, May 1998.*

Campione et al.; The Java Tutorial Second Edition: Object–Oriented Programming for the Internet (Java Series). Addison–Wesley Publishing Company, section: "Trail: JDK 1.1—And Beyond!: What's New in 1.1?: Internationalization", Mar. 1998.*

* cited by examiner

FIG. 3

PROGRAM SOURCE CODE 61

EXAMPLES OF CALLS IN SOURCE CODE:
STRING TEMP = RESOURCE.GET("TEMPHOT", "HOT");
// HOT TEMPERATURE
STRING TASTE = RESOURCE.GET("TASTEHOT","HOT");
// HOT TASTE

62

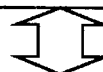

GENERATE RESOURCE BUNDLE SYSTEM 70

RULES IN GENERATE RESOURCE BUNDLE ENFORCE THE FOLLOWING SYNTAX:
1. NO SOURCE LINE MAY CONTAIN MORE THAN ONE CALL TO RESOURCE.GET
2. EVERY SOURCE LINE CONTAINING A CALL TO RESOURCE.GET MUST BE COMMENTED WITH A "//" COMMENT OR IMMEDIATELY PRECEDED BY A LINE CONTAINING ONLY A "//" COMMENT. IF BOTH COMMENTS EXIST, THE ONE ON THE SOURCE LINE IS USED.
3. THE COMMENT HELPS THE TRANSLATOR LOCALIZE THE STRING.
4. THE COMMENT SHOULD BE DESCRIPTIVE AND PROVIDE SOME CONTEXT.
5. IF THE STRING IS A MESSAGE FORMAT, THE COMMENT SHOULD DESCRIBE THE FORMAT ARGUMENTS.
6. EACH CALL TO RESOURCE.GET MUST BE COMPLETELY CONTAINED ON A SINGLE SOURCE LINE.
7. NO KEY CAN HAVE MORE THAN ONE VALUE OR MORE THAN ONE COMMENT.
8. A KEY WITH THE SAME VALUE AND COMMENT MAY APPEAR MULTIPLE PLACES IN ONE OR MORE FILES.
9. ALL ARGUMENTS MUST BE QUOTED (") STRING LITERALS.
10. QUOTES (") WITHIN STRING LITERALS MUST BE PRECEDED BY BACKSLASH (\).

78

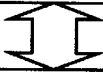

FH RESOURCE BUNDLE PROGRAM FILE 90

94

EXAMPLES OF GENERATED BUNDLED SOURCE CODE:

// Hot Temperature    { "tempHot", "Hot" }.
// Hot Taste          { "tasteHot", "Hot" }.

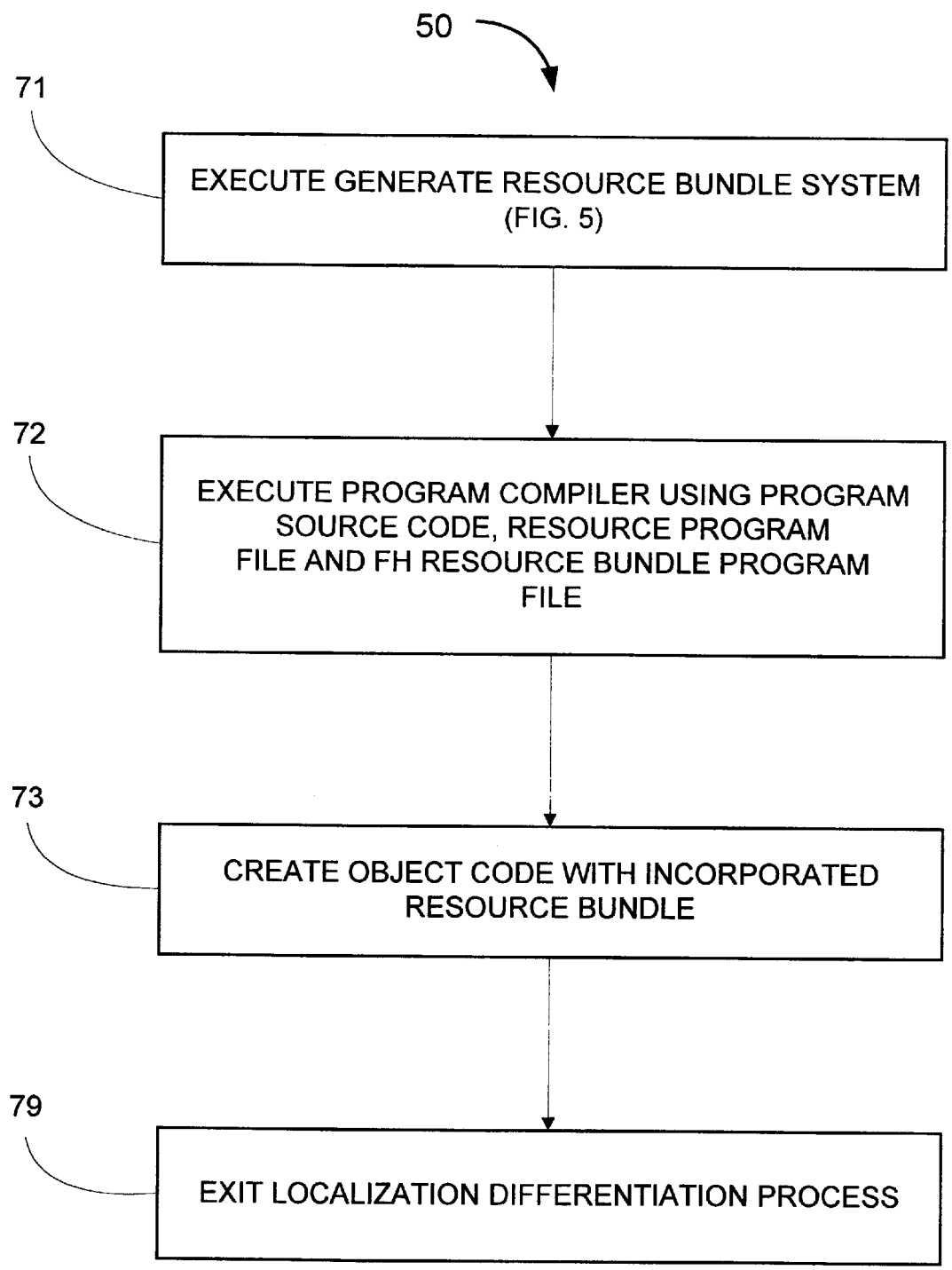

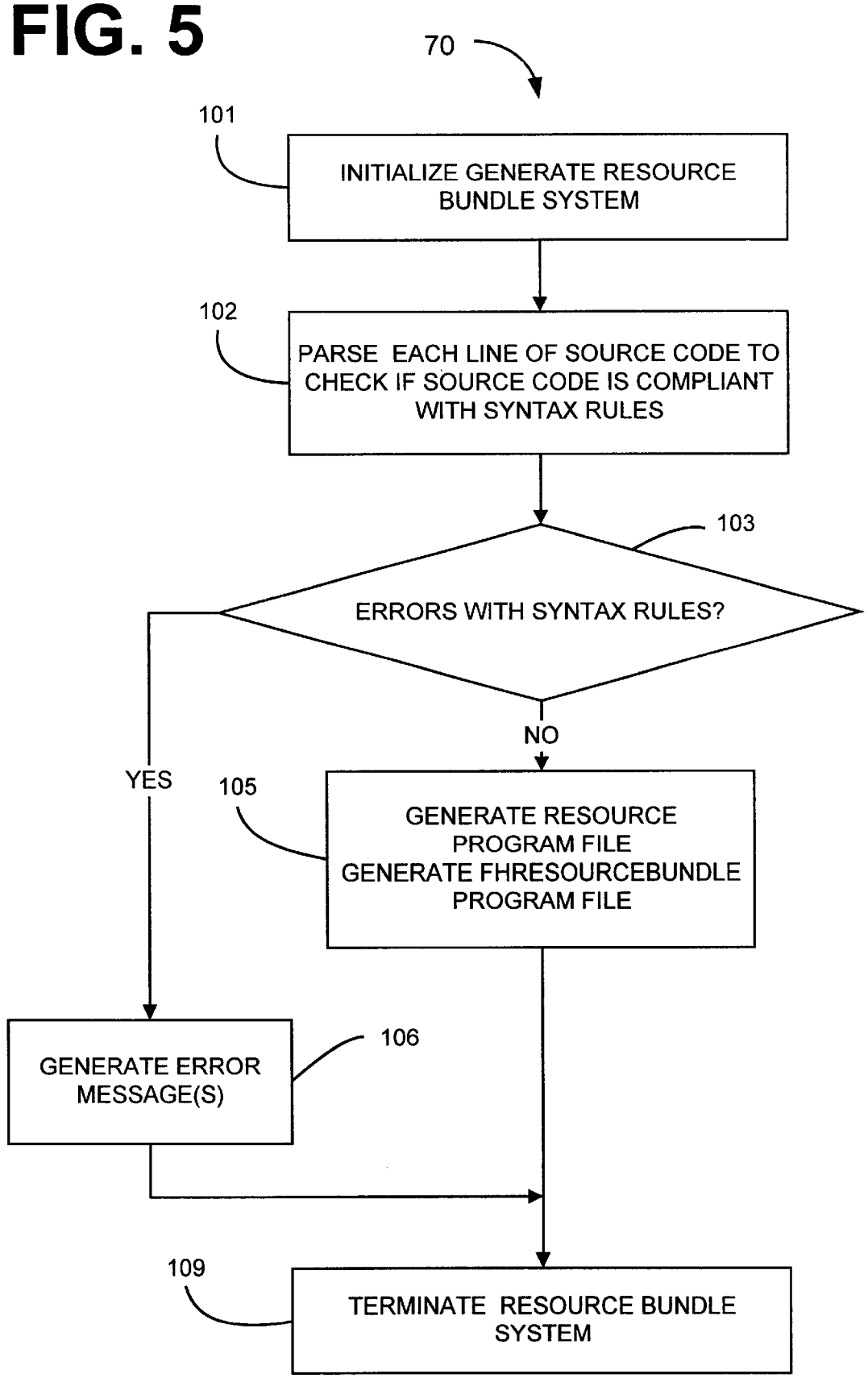

SYSTEM AND METHOD FOR TERM LOCALIZATION DIFFERENTIATION USING A RESOURCE BUNDLE GENERATOR

BACKGROUND OF THE INVENTION

1. Field of the Invention

The present invention generally relates to computers and software, and more particularly, to differentiation of localized (i.e. internationalized for language including region or dialect, or by profession or industry, including acronyms, etc.) terms utilizing a resource bundle generator.

2. Description of Related Art

As known in the art, localization of a term is a process of altering a program so that it is suitable for the target user. However, localization of programs requires a little more effort and is generally program language specific. The major problem of localization is making the program flexible enough to display messages or other types of user visible text to the target user in the appropriate language for the current locale, dialect or profession. Typically, this means that the program cannot use hard coded messages and must instead read in a set of messages at runtime, based on the locale setting.

In the well known Java programming language developed by Sun Microsystems, Inc., there are packages, i.e., programs created to perform a particular type of work, that are designed to allow a programmer to localize the handling of numbers, dates, times, string comparisons, and so on. A function "number format" is used to convert numbers, monetary amounts, and percentages to the appropriate textual format for a locale. Similarly, the "data format" class, along with "calendar" and "time zone" classes from the Java utility package, are used to display dates and times in a localized specific way. The "collector class" is used to compare strings according to the alphabetization rules of a given locale and the "break iterator" class is used to locate the word, line, and sentence boundaries for that given locale.

The Java programming language also provides an easy way to localize messages by defining messages as key/value pairs in a "Resource Bundle" subclass. The programmer creates a subclass of "Resource Bundle" for each language or locale for which the application supports naming each class following a convention that includes the locale name. At runtime the programmer uses the "ResourceBundle.getBundle( )" method to load the appropriate "Resource Bundle" class for the current locale. The "Resource Bundle" contains the messages the application uses, each associated with a key that served as the message name. Using this technique, the application can look up the localized dependent message translation based on the localized independent message name.

However, a primary difficulty with this localized independent message methodology is the lack of the ability to provide localization of a message that may have more than one definition for conversion, i.e. localization differentiation. An example of this would be to utilize the string "hot" which in English refers to situations for both temperature and taste. A localization for these two different cases in Spanish have two different meanings. The "picante" (taste) and "caliente" (temperature).

SUMMARY OF THE INVENTION

The present invention provides a system and method for term localization differentiation. In accordance with one aspect of the invention, the system and method utilize a second key to assist the resource bundle generator in the localization of an input string. The second key should be descriptive and provide some context of the string to be translated. If the string being localized is a message, the second key should characterize the string in the proper context.

In an alternative embodiment, the second key can appear in the form of a comment to the first resource bundle key and value. The second key allows the application to specify different strings for each duplicative first key. The additional key provides for an increase in the reliability of the localization.

The present invention can also be conceptualized as providing a system for differentiating a localized message utilizing a resource bundle generator. In this regard, the system can be broadly summarized by the following components: program source code, a resource bundle system that interacts with the program source code, verifies compliance of the program source code with the syntactical rules, and generates data files to assist in the localization of source data values. The resource bundle program file contains a localization term library, and the resource program file is a source file for loading the resource bundle program file.

The present invention can also be conceptualized as providing a method for differentiating a localized message utilizing a resource bundle generator. In this regard, the method can be broadly summarized by the following steps: maintaining a list of a plurality of localized differentiated terms, parsing a source program for a token, transmitting a request for differentiation and the said token, if said token includes more than one key, matching said token to said list of said plurality of localized differentiated terms, providing a differentiation token of said token, generating a localization token for said differentiation token if said differentiation token exists, generating a localization token for said token if said differentiation token does not exist, and generating object code of said source code including said localization token.

Other features and advantages will become apparent to one with skill in the art upon examination of the drawings and detailed description.

BRIEF DESCRIPTION OF THE DRAWINGS

The accompanying drawings incorporated in and forming a part of the specification illustrate several aspects of the present invention, and together with the description, serve to explain the principles of the invention. Moreover, in the drawings, like reference numerals designate corresponding parts throughout the several views. In the drawings:

FIG. 3 is a block diagram of the generate resource bundle system of FIGS. 1 and 2 showing the connections from source code to the generate resource bundle system that enforces syntax rules and generates localized differentiation source code for better compilation.

FIG. 4 is a flow chart of the generate resource bundle localization differentiation process, as shown in FIG. 3 in accordance with the present invention.

FIG. 5 is a flow chart of the generate resource bundle localization differentiation process, as shown in FIG. 4, in accordance with the present invention.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
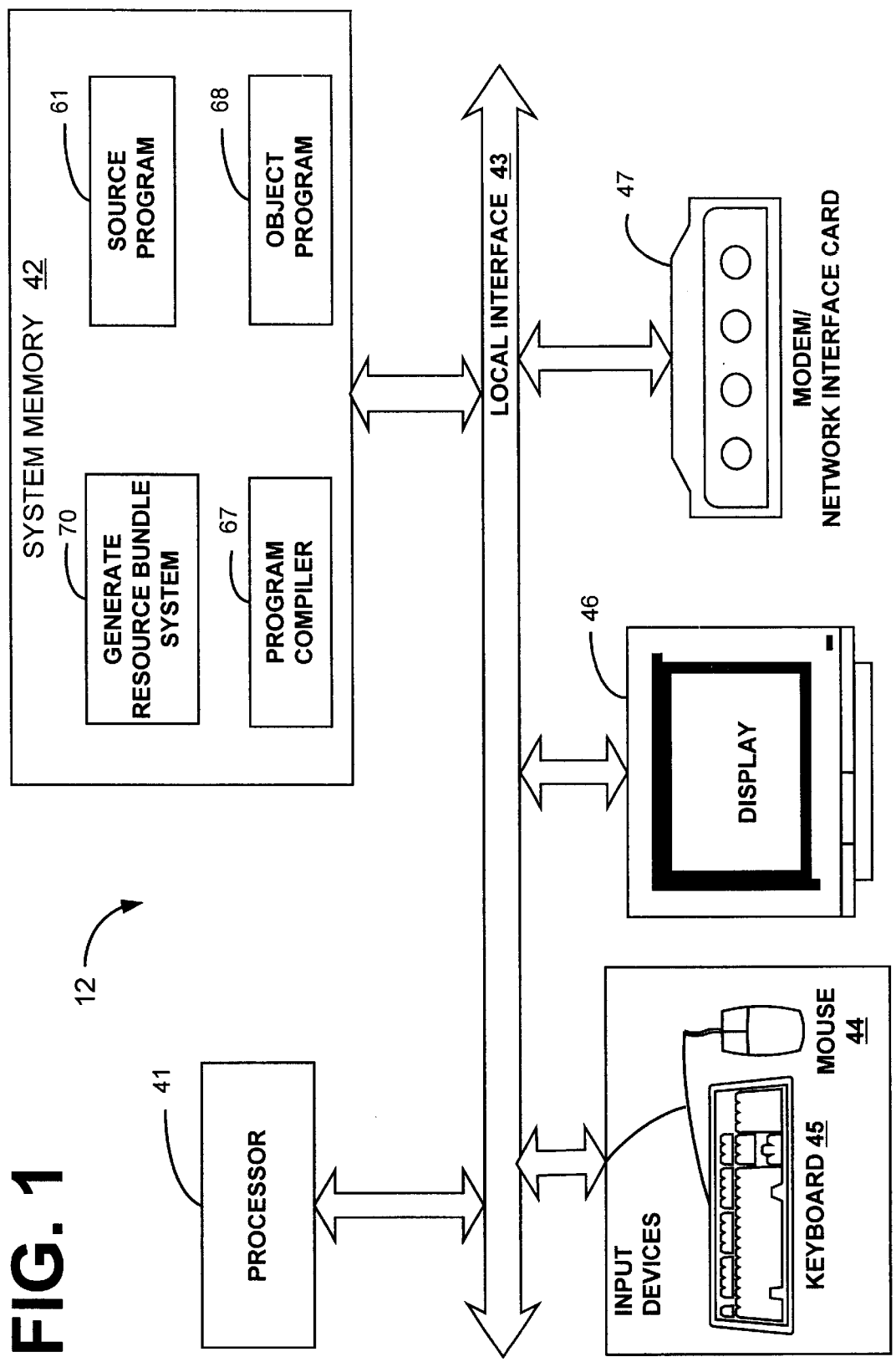
FIG. 1 is a block diagram of a computer system with a generate resource bundle source system in a system memory in accordance with the present invention.

As illustrated in FIG. 1, the computer system 12 comprises a processor 41 and a system memory 42 with an operating system (not shown). The processor 41 accepts data from system memory 42 over the local interface or bus 43. The system memory 42 can be either one or a combination of the common types of memory, for example, but not limited to, erasable programmable read only memory (EPROM), electronically erasable programmable read only memory (EEPROM), flash memory, programmable read only memory (PROM), random access memory (RAM), read only memory (ROM), system memory, or nonvolatile memory such as disk drives, tape drives, compact disc read only memory (CD-ROM) drives, cartridges, cassettes, or memory located on a network server. Direction from the user can be signaled by using the input devices, for example, but not limited to, a mouse 44 and keyboard 45. The action input and result output are displayed on the display terminal 46.

The generate resource bundle system 70 of the present invention can be implemented in hardware, software, firmware, or a combination thereof. In the preferred embodiment, the generate resource bundle system 70 is implemented in software or firmware that is stored in a memory, such as system memory 42, and that is executed by a suitable instruction execution system, such as processor 41. While the system configuration could take many forms, the diagram of FIG. 1 illustrates that the generate resource bundle system 70 resides in system memory 42. The generate resource bundle system 70 performs a precompilation of source program 61 and creates files that assist in the localization of terms within the source program 61. The resource bundle program file 90 contains a localization term library, and the resource program file 80 is a source file for loading the resource bundle program file 90. These files assist in the localization differentiation of source program 61 terms herein defined in further detail with regard to FIG. 2. The resource bundle file 90 and resource program file 80 are provided as inputs, along with the program source code 61, to the program compiler 67. The program compiler 67 generates a program object code 68. The program object code 68 includes an object code version of both resource program file 80 and resource bundle program file 90 for execution of the term localization differentiation.

A generate resource bundle system 70 then provides the ability to utilize a second key to assist the localization of a term within the source program 61 code that may have multiple meanings and therefore needs to be further differentiated.

Figure 2:
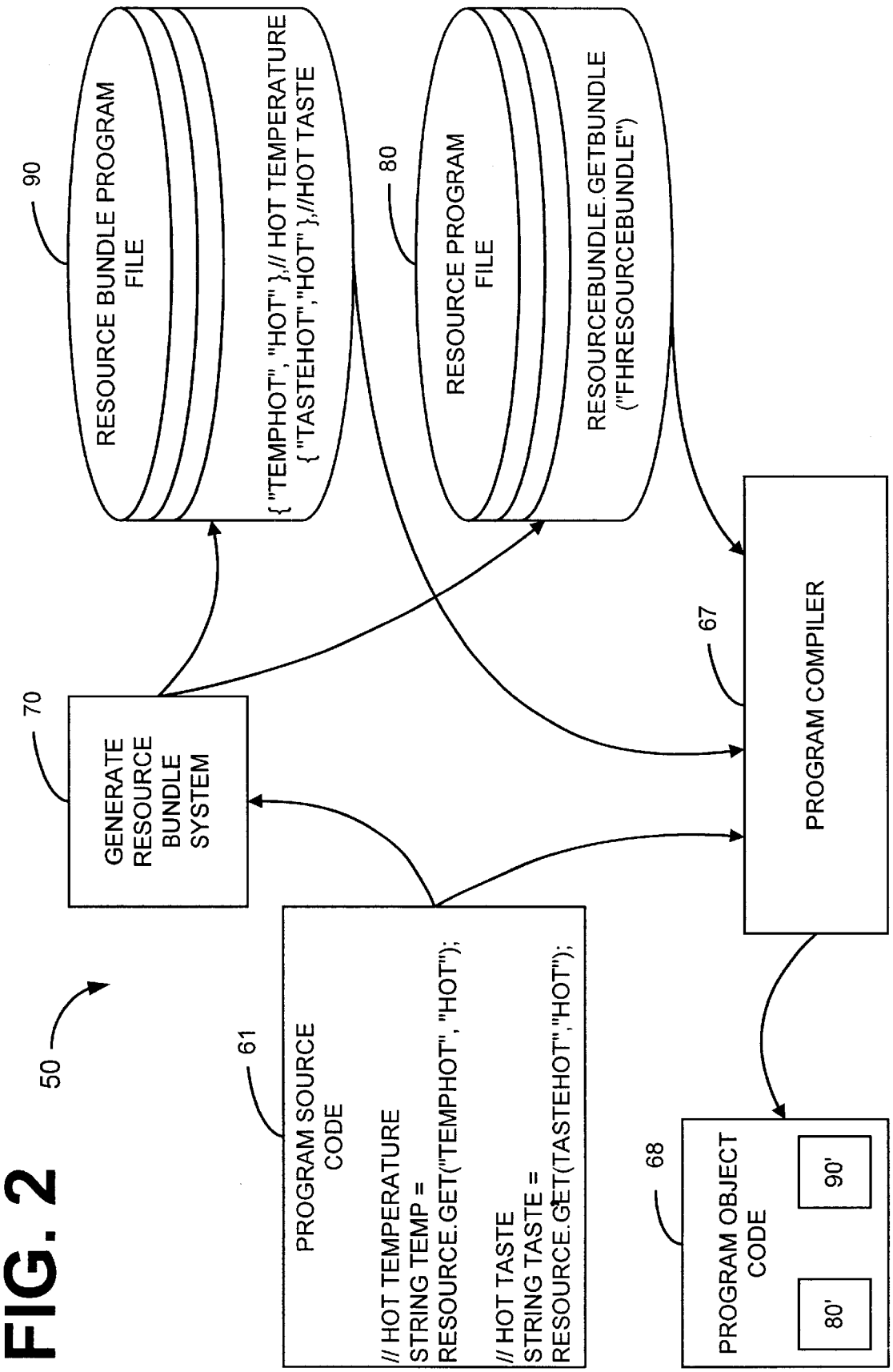
FIG. 2 is a block diagram showing the structure and method of the generate resource bundle system as shown in FIG. 1.

FIG. 2 is a block diagram of a possible architecture of the term localization differentiation 50, implemented by the generate resource bundle system 70. The generate resource bundle system 70 interacts with program source code 61. The program source code 61 is input into the generate resource bundle system 70 to verify compliance with the syntactical rules herein defined with regard to FIG. 3. The generate resource bundle system 70, upon verification of the program source code 61 with the syntactical rules, generates data files to assist in the localization differentiation of source data values. The resource bundle generator files built to assist in the localization differentiation include, a resource bundle program file 90, which is a localization differentiation term library, and a resource program file 80, which is a source file for loading the localization differentiation term library resource bundle program file 90.

The resource bundle program file 90, is a library of localization differentiation terms that include at least a first key, an optional second key, and a value for source code term localization. Upon completion of the execution of the generate resource bundle system 70, the resource bundle file 90 and resource program file 80 are provided as inputs, along with the program source code 61, to the program compiler 67. The program compiler 67 generates a program object code 68, which can be a machine code that can be directly executed by the processor 41. The resource program file 80 and resource bundle program file 90 are embedded within the program object code 68 as resource program file 80' and resource bundle program file 90' to provide term localization differentiation during execution of the program object code 68.

A localization differentiation system 50 of the present invention utilizes the resource bundle functionality provided by the Java system. The generate resource bundle system 70 of the present invention parses a call from the program source code 61 to the resource bundle program 90. The generate resource bundle system 70 determines if the term for localization includes one or more keys. If the localization term includes only one key for localization, then the generate resource bundle system 70 defaults to the single key to build an item term, the library of localization terms within resource bundle program file 90. In those instances where the term to be localized has more than one definition for conversion, the source code 61 provides two search keys. The dual search keys are utilized in the generate resource bundle apparatus 70 to differentiate the term (i.e., message) and utilize the second key in the build an item term in the resource bundle program file 90. In this way, the programmer is able to provide for localized term differentiation without modifying source code prior to compilation. The localization term differentiation information is found in resource bundle program file 90 and is provided to the program compiler 67 to aid in the compilation and creation of the program object code 68. This program object code 68 can also be executable code in some implementations. The resource program file 80 and resource bundle program file 90 are embedded within the program object code 68 as resource program file 80' and resource bundle program file 90' to provide term localization differentiation during execution of the program object code 68.

Illustrated in FIG. 3 is a block diagram showing a possible architecture and process implemented by the generate resource bundle system 70. The resource bundle 70 accepts calls in source code 61, as shown in block 62. The source code 61 is validated to ensure compliance with rules at process 78.

Rule numbers 1 through 10 are illustrated below as examples, however, the syntactical rules are not meant to be limited to just the syntactical rules illustrated.

1. No source line may contain more than one call to resource.get.

2. Every source line containing a call to resource.get must be commented with a "//" comment or immediately preceded by a line containing only a "//" comment. If both comments exist, the one on the source line is used.

3. The comment helps the translator localize the string.

4. The comment should be descriptive and provide some context.

5. If the string is a message format, the comment should describe the format arguments.

6. Each call to resource.get must be completely contained on a single source line.

7. No key can have more than one value or more than one comment.

8. A key with the same value and comment may appear multiple places in one or more files.

9. All arguments must be quoted (") string literals.

10. Quotes (") within string literals must be preceded by backslash (\).

After checking the source code for compliance with the syntactical rules in block 78, the generate resource bundle system 70 produces generated bundle source code in block 64. This generated resource bundle source code, as illustrated in block 94, is input to the program compiler 67 for compilation into object code 68 as illustrated with regard to FIG. 2.

Illustrated in FIG. 4 is a flow diagram of a possible process of the term localization differentiation system 50, utilizing the generate resource bundle system 70. The generate resource bundle system 70 is executed at step 71. The steps for the execution and output of the generate resource bundle system 70 is herein defined in further detail with regard to FIG. 5. The generate resource bundle system 70, as previously shown, accepts source code 61 input for precompilation. The generate resource bundle system 70 generates output consisting of at least one source loading file and a library of localization terms extracted from the source code 61.

The program compiler 67 is then executed at step 72. The program compiler 67 accepts the program source code 61, the resource program file 80, and resource bundle program file 90 as input. The program compiler 67 parses the source code 61 and transforms the text into object code 68 utilizing the localization terms extracted by the generate resource bundle system 70 at step 71. The program compiler 67 creates the object code 68 with the incorporated resource bundle localization terms at step 73. The general resource bundle system 70 and program compiler 67 are terminated at step 79.

Illustrated in FIG. 5 is a possible architecture and process implemented by the generate resource bundle system 70. The generate resource bundle system 70 is initialized at step 101. The generate resource system 70 parses each line of source code 61 to verify if the source code 61 is compliant with the syntax rule 78 hereindefined above at step 102. The generate resource system 70 determines in the parsing operation if a term for localization is found. If a term for localization is found, then the generate resource bundle system 70 further determines if the term for localization includes one or more keys. If the localization term includes only one key for localization, then the generate resource bundle system 70 defaults to the single key to generate the library of localization terms within resource bundle program file 90. In those instances where the term to be localized has more than one definition for conversion, the generate resource bundle system 70 generates two search keys to generate the library of localization terms and then the resource bundle program file 90.

The generate resource bundle system 70 checks if there are any errors with the syntax rule 78 at step 103. If no errors have been detected, then the generate resource bundle system 70 generates the resource program file 80 and resource bundle program file 90 at step 105. The resource bundle generator files built to assist in the localization are the resource program file 80 which is a source file for loading the localization term library created in the resource bundle program file 90. The generate resource bundle system 70 is then terminated at step 109.

If at step 103 the generate resource bundle system 70 detects errors in the validation of the source code 61, the generate resource bundle system 70 generates the appropriate error message(s) at step 106. These error messages indicate to the user which lines of the source code are not in compliance with the syntactical rule 78 and which of the syntactical rules each line of the source code 61 violates. The generate resource bundle system 70 is terminated at step 109.

During execution of the object program 68, the resource bundle program file 90', residing within the object code, is accessed to provide term (i.e., messages) localization and, if required, term differentiation localization in cases of terms having multiple meanings.

In an alternative embodiment, the second key can appear in the form of a comment to the first resource bundle key and value. The parsing operation is constructed to allow the comment for a term to be localized to perform the function of the second key. The second key allows the application to specify different strings for each duplicative first key. The additional key provides for an increase in the reliability of the localization.

In another alternative embodiment, the modem/network interface card 47 can be utilized to send to or receive from another computer system on a computer network, i.e., in a distributed computer system, either one or a combination of the following: source program 61; the program compiler 67; the object program 68; the resource program file 80; and the resource bundle file 90, which also includes the message translation call to the resource bundle file 90 during execution of the object program 68.

It is further contemplated by the inventor that creation and processing of the system or method associated with the resource bundle generator with localization differentiation may occur on computer systems connected to either a public or private network, i.e., in a distributed system. The program object program code 68 generated by the program compiler 67 includes the localized and localized differentiated messages as defined and provided in the resource bundle program file 90 and the resource program file 80 which provides execution of the resource bundle program file 90 messages within the object program code 68.

It is further contemplated by the inventor that the differentiation localization system may be operated on a public or private network such as the Internet. In an example of a network application, the source program 68 would be downloaded from a source computer to a destination computer over the Internet. Upon execution of the object program 68 on a destination computer, the message translation call to the resource bundle program file 90 would proceed back to the source computer to fulfill that request. The message response from the message translation call would then be transmitted from the source computer to the destination computer for display or processing.

The resource bundle generator with localization differentiation comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the script for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the script is printed, as the script can be electronically captured via, for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for differentiating a localized message utilizing a resource bundle generator, the method comprising the steps of:

maintaining a list of said plurality of localized differentiated terms parsing a source program for a token;

transmitting said token to said list of said plurality of localized terms, said token includes at least two keys, wherein a first key is a general translation key and a second key of said at least two keys is used in term differentiation when said localized terms have multiple meanings;

registering said token within said list of said plurality of localized differentiated terms; and generating an object code of said source code, including said token.

2. The method of claim 1, wherein said parsing step further comprises the step of:

determining if said source code is compliant with a plurality of syntax rules.

3. The method of claim 2, wherein said compliant determining step further comprises the step of:

transmitting a error token to said resource bundle generator if said source code is not compliant with anyone of said plurality of said syntax rules.

4. The method of claim 1, wherein said parsing step further comprises the step of:

determining if said token includes only one key; and generating a duplicate of said only one key, in said token.

5. The method of claim 1, wherein the step of generating object code further includes the step of:

utilizing said token for displaying of text messages in a language other than said source code original language.

6. A system for differentiation of a localized message utilizing a resource bundle generator, said differentiating system comprising:

a means for maintaining a list of a plurality of localized differentiated terms;

a means for parsing a source program for a token;

a means for transmitting said token to said list of said plurality of localized terms, said token includes at least two keys, wherein a first key is a general translation key and a second key of said at least two keys is used in term differentiation when said localized terms have multiple meanings;

a means for registering said token within said list of said plurality of localized differentiated terms; and a means for generating an object code of said source code, including said token.

7. The system of claim 6, wherein the parsing means further comprises:

a means for determining if said source code is compliant with a plurality of syntax rules.

8. The system of claim 7, wherein the compliant determining means further comprises:

a means for transmitting an error token to said resource bundle generator if said source code is not compliant with anyone of said plurality of said syntax rules.

9. The system of claim 6, wherein the parsing means further comprises:

means for determining if said token includes only one key; and means for generating a duplicate of said only one key, in said token.

10. The system of claim 6, wherein the generating object code means further comprises:

means for utilizing said token for displaying of text messages in a language other than said source code original language.

11. A system for differentiation of a localized message, said differentiating system comprising:

a memory;

a source program in said memory;

a message translation library including a plurality of registered translation messages;

a resource bundle generator for localizing a message, said resource bundle generator parses said source program for a message translation call that includes at least two keys, wherein a first key is a general translation key and a second key is a difference key when said messages have multiple meanings, said resource bundle generator transmits said message translation call including said differention key to said message translation library for message translation registration;

whereby a program compiler generates an object code version of said source code that contains said message translation call, including said differention key.

12. The system of claim 11, wherein said resource bundle generator further comprises:

a logic configured to determine if said source code is compliant with a plurality of syntax rules.

13. The system of claim 12, wherein said message translation library further comprises:

a logic configured to transmit an error message to said resource bundle generator if said source code is not compliant with anyone of said plurality of said syntax rules.

14. The system of claim 11, wherein said resource bundle generator further comprises:

a logic configured to determine if said message translation call includes said second key for indicating that differentiation of a localized message is required;

wherein said determination logic selects said second key to be included in said transmission of said a message translation call to said message translation library for message translation; and wherein said determination logic defaults selection to said first key for transmission of said message translation call to said message translation library for message translation if said second key is omitted.

15. The system of claim 11, wherein said object code further comprises:

a logic configured to utilize said message translation call to display a text message in a language other than original language of said source code.

16. A message internationalization differentiation product for differentiation of a internationalized message utilizing a resource bundle generator, said differentiating product comprising:

a computer readable recording medium;

a means recorded on the medium for maintaining a list of a plurality of localized differentiated terms;

a means recorded on the medium for parsing a source program for a token;

a means recorded on the medium for transmitting said token to said list of said plurality of localized terms, said token includes at least two keys, wherein a first key is a general translation key and a second key of said at least two keys is used in term differentiation when said localized terms have multiple meanings;

a means recorded on the medium for registering said token within said list of said plurality of localized differentiated terms; and a means recorded on the medium for generating an object code of said source code, including said token.

17. The product of claim 16, wherein the parsing means further comprising:

a first routine means, responsive to the parsing means, for determining if said source code is compliant with a plurality of syntax rules.

18. The product of claim 17, wherein the parsing means further comprising:

a second routine means, responsive to the compliant determining means, for transmitting an error token if said source code is not compliant with anyone of said plurality of said syntax rules.

19. The product of claim 16, wherein the parsing means further comprising:

a means recorded on the medium for determining if said token includes only one key; and a means recorded on the medium for generating a duplicate of said only one key, in said token.

20. The product of claim 16, wherein the generating means further comprises:

a third routine means, responsive to said maintaining means, for utilizing said token to display said text messages in a language other than said source code original language.

* * * * *